May 26, 1931.  L. T. FREDERICK  1,807,155
MEANS FOR AND METHOD OF MOLDING MATERIALS
Filed March 15, 1928  4 Sheets-Sheet 1

INVENTOR:
Louis T. Frederick
BY Cheever & Cox
Attys

May 26, 1931. L. T. FREDERICK 1,807,155
MEANS FOR AND METHOD OF MOLDING MATERIALS
Filed March 15, 1928 4 Sheets-Sheet 2
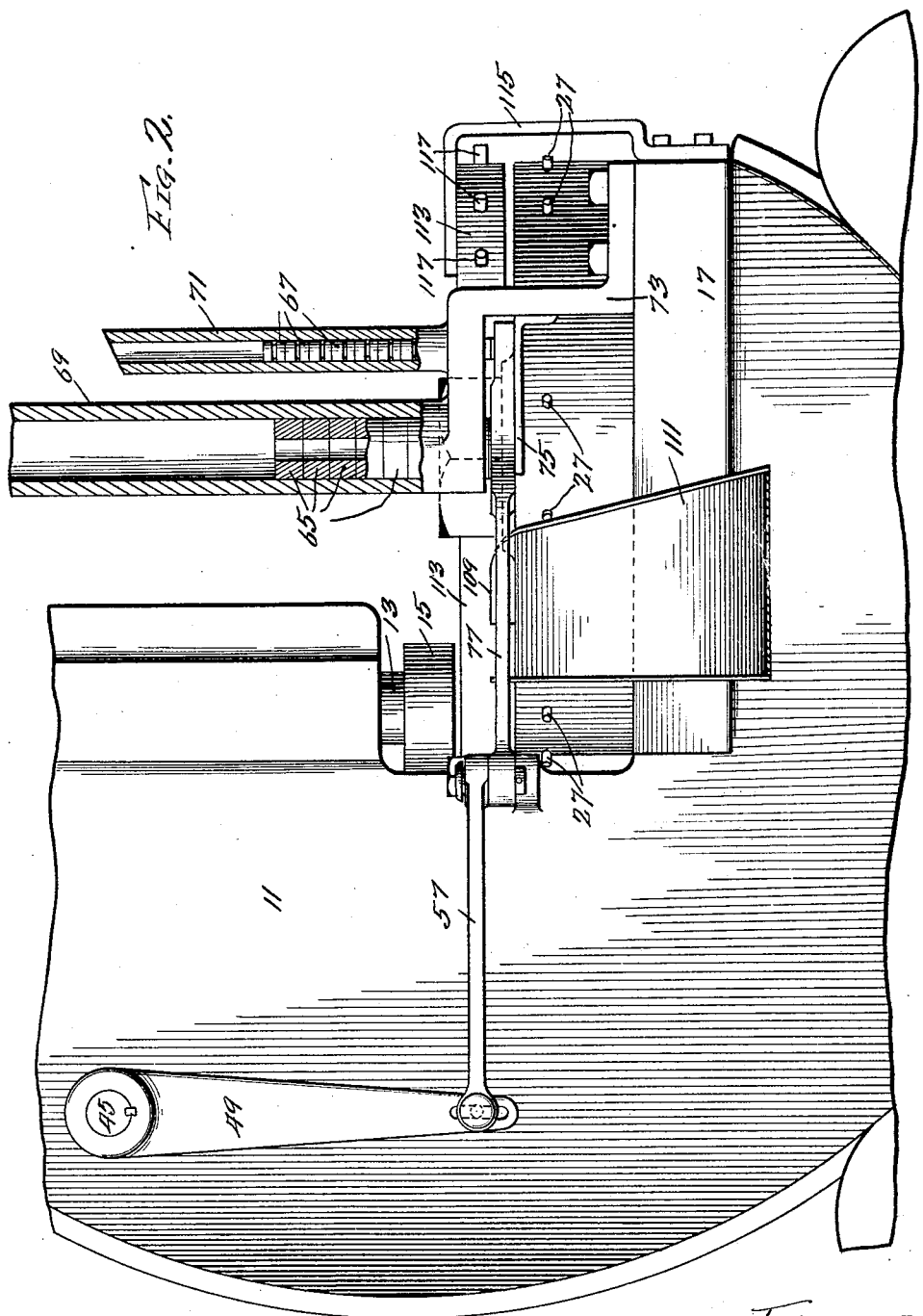
INVENTOR:
LOUIS T. FREDERICK
BY Cheever & Cox
ATT'YS

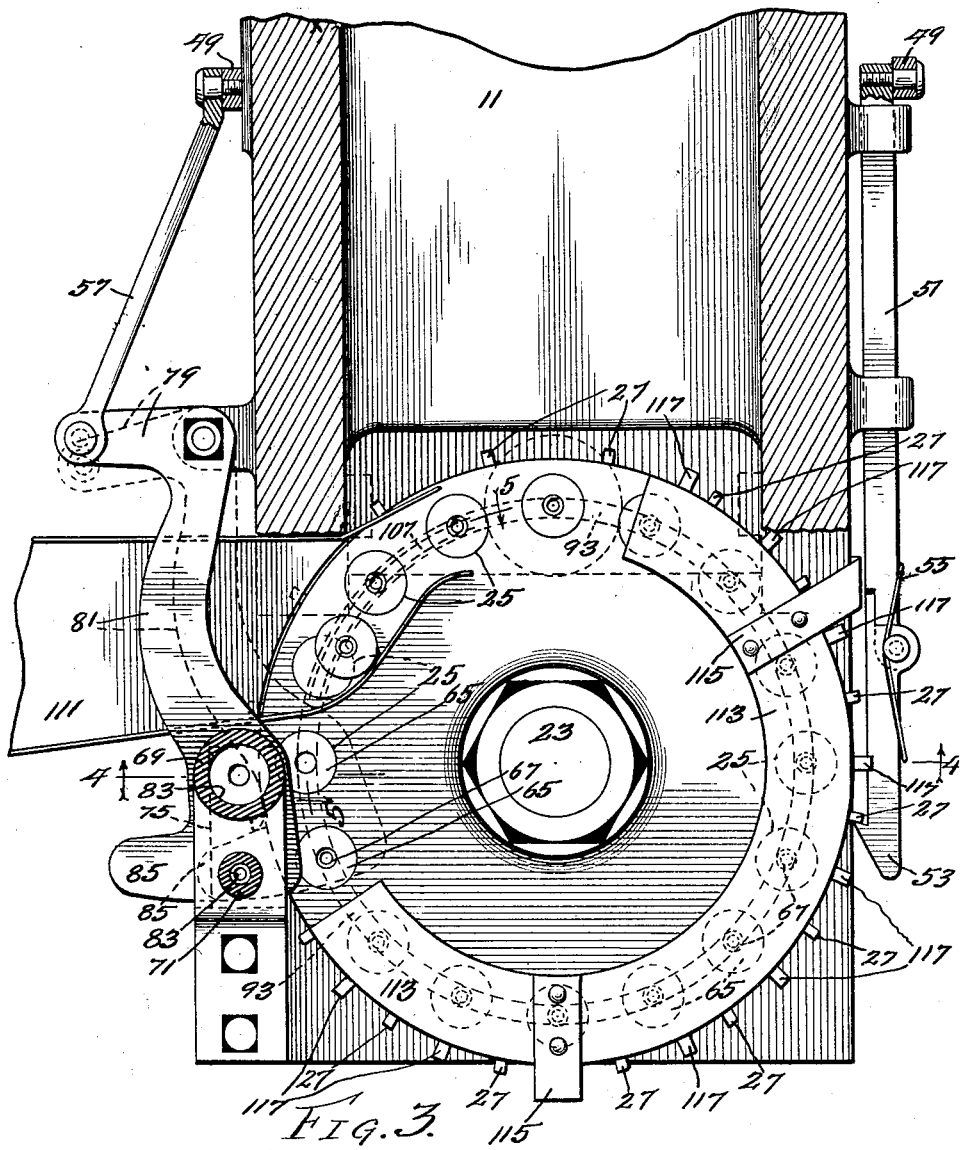

May 26, 1931. L. T. FREDERICK 1,807,155
MEANS FOR AND METHOD OF MOLDING MATERIALS
Filed March 15, 1928 4 Sheets-Sheet 4
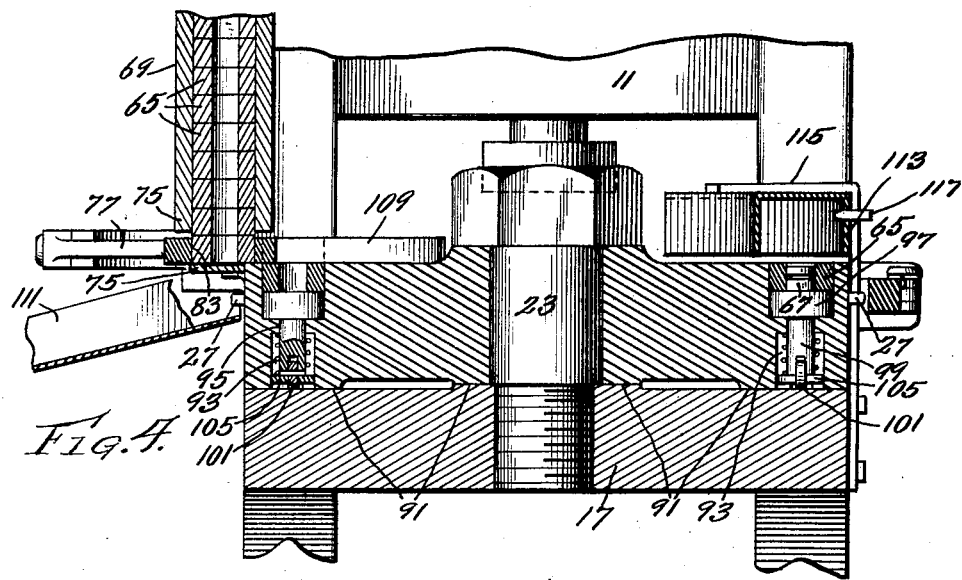
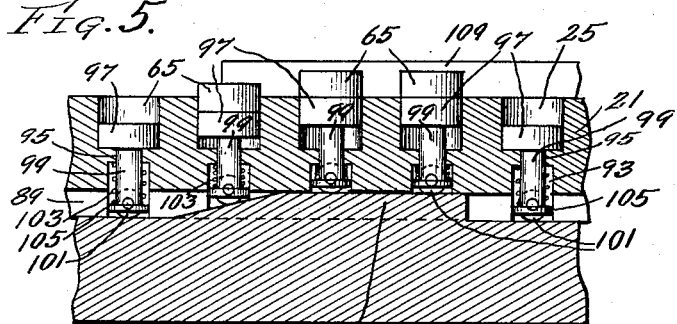
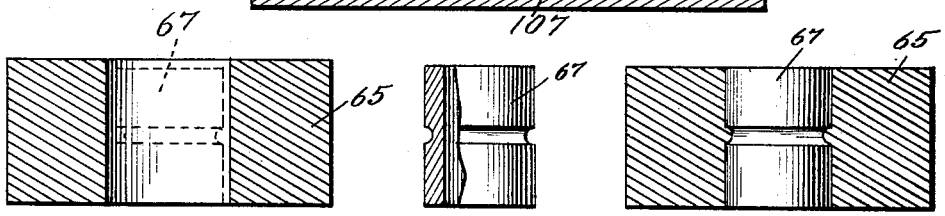
INVENTOR:
LOUIS T. FREDERICK
BY Cheever & Cox
Attys Patented May 26, 1931

1,807,155

UNITED STATES PATENT OFFICE

LOUIS T. FREDERICK, OF VALPARAISO, INDIANA, ASSIGNOR, BY MESNE ASSIGNMENTS, TO CONTINENTAL DIAMOND FIBRE COMPANY, OF NEWARK, DELAWARE, A CORPORATION OF DELAWARE

MEANS FOR AND METHOD OF MOLDING MATERIALS

Application filed March 15, 1928. Serial No. 261,759.

My invention relates in general to a method and apparatus for molding materials and has more particular reference to the provision of various features of novelty whereby moldable materials may be fed successively into a closing mold to be pressed therein for an appreciable period whereby the moldable material may be pressed to a desired form. More specifically, the apparatus of my invention is adapted to receive pre-formed blocks of molded material, to transport the blocks successively through a heating or curing oven and thereafter to press the same for an appreciable period in a closing mold whereby to give the block a desired shape.

In my co-pending applications, Serial Nos. 247,671 and 659,757, filed respectively, Jan. 18, 1928, and Mar 7, 1928, I have illustrated and described means for feeding blocks of various types of moldable material to a closing mold to be thereby pressed to desired shape and my present invention has for an object the provision of a device for the same general purpose but having various novel features of advantage.

Another important object of my present invention is to provide a novel conveyer for carrying blocks of moldable material to a closing mold, the closing mold and its associated conveyer being arranged in a novel and compact manner whereby to promote space efficiency in the machine.

Another important object of my invention is to provide, in a device of the class described, a novel carrier adapted to co-operate with the movable member of a closing mold in order to form a mold adapted to deform the moldable material carried thereby to a desired shape.

Another important object of the invention is to provide a movable carrier for transporting moldable material to the movable die of a closing mold, the carrier being adapted to form the molding member of the closing mold after carrying the moldable material to molding position beneath the movable die.

Still another important object of my present invention is to provide a novel means for ejecting molded objects from the carrier.

A further important object of my present invention is to provide a novel means for depositing blocks of moldable material in the carrier.

A still further object of the invention is to provide a novel method of molding material wherein the molding operation is rendered continuous by forming a plurality of molds, successively loading the molds with moldable material, and passing them successively to co-operating position with a movable die whereby the material therein may be deformed to desired shape.

Numerous other objects and advantages of the invention will be apparent as it is understood from the following description which, taken in connection with the accompanying drawings, discloses a preferred embodiment of my invention.

Referring to the drawings:

Figure 2 is an enlarged view of portions of the device illustrated in Figure 1, parts of which have been broken away to reveal the details of construction;

Figure 3 is a horizontal cross section taken substantially along the line 3—3 in Figure 1;

Figure 4 is a vertical cross section taken substantially along the line 4—4 in Figure 3;

Figure 5 is a vertical cross section taken substantially along the line 5—5 in Figure 3;

Figure 6 is a vertical cross section taken through a block of moldable material which may be handled by the device of my invention;

Figure 7 is a perspective view of an insert adapted to be assembled with the moldable material by the apparatus of my invention; and Figure 8 is a perspective view partially in cross section of a form of molded object adapted to be produced by the devices of my invention.

Figure 1:
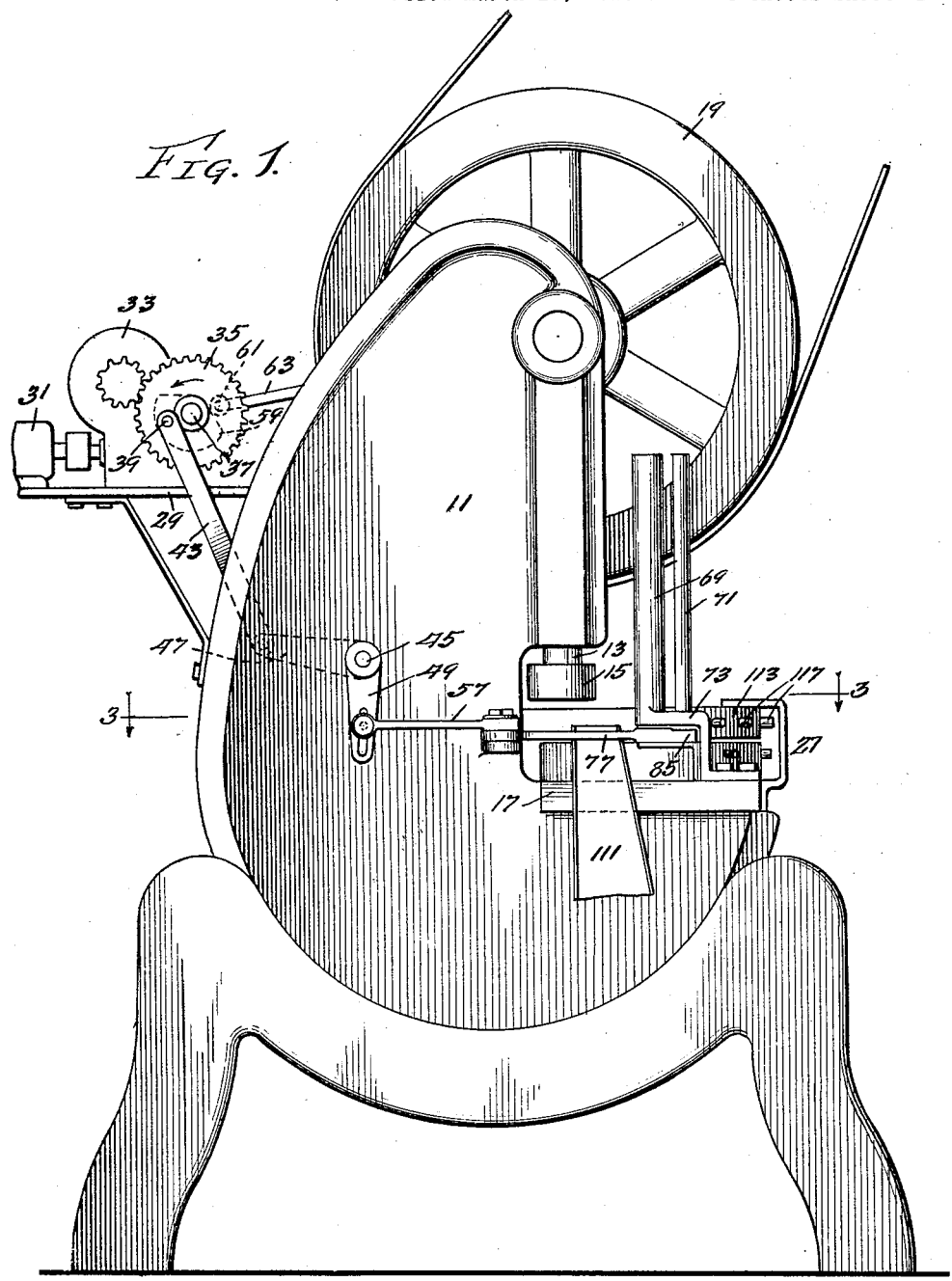
Figure 1 is a side elevation of a device embodying my invention.

To illustrate my invention I have shown on the drawings, a closing mold comprising a press having a frame 11 in which a die operating shaft or ram 13 is slidably mounted for vertical reciprocating movement. This shaft carries at its lower end a movable die 15 which is adapted to descend upon and deform a block of moldable material suitably arranged there-beneath. The die operating ram 13 may be reciprocated by any suitable mechanism operating from the fly-wheel 19 which in turn is driven from any suitable source of power by any suitable means such as the belt illustrated. The frame 11 of the press is formed to provide a support portion or table 17 beneath the movable die 15, and a lower multiple mold member or turn table 21 is pivotally mounted on this table by means of a suitable pivot 23 in such position that a peripheral portion of the member 21 may pass beneath the die 15. A plurality of sockets 25 adapted to receive pre-formed blocks of moldable material are formed around the periphery of the die member 21 at spaced intervals and at a distance from the center of rotation of the member such that, upon rotation of the die member, the sockets 25 may be successively positioned vertically beneath the die 15. The die 15 and the turn table 21 may be heated or chilled by any convenient method depending upon whether the moldable material is to be formed in a heated or chilled mold, and since the method of heating the members is not material to the present invention, a detailed description hereof is thought to be unnecessary.

The member 21 comprises a socketed turn table and I have provided means for rotating the turn table progressively and by equal amounts so that the sockets may be successively positioned beneath the movable die 15 in such position that moldable material contained in the sockets may be successively molded by the die 15, the die and the socketed portions of the member 21 co-operating to provide a closing mold for the material in the sockets. I have also provided means for introducing pre-formed blocks of moldable material into the sockets, from a suitable magazine 69 arranged in the frame adjacent the pivoted member 21, as the sockets remain stationary opposite the magazine during the molding stroke of the die 15. The operating movements of the die 15, the means for loading the moldable material into the sockets, and the means for progressively rotating the die member 21 are synchronized and controlled by suitable mechanisms operated by a control motor 31 which is mounted on a bracket 29 suitably secured to the frame 11 of the press. The motor operates through reduction gears 33 to drive a gear 35 mounted on a shaft 37 suitably journaled in the frame 11. The motor 31 operates at constant speed so that the shaft 37 drives the several operating and control mechanisms hereinafter described, at a uniform rate.

The shaft 37 carries a disc having a pin 39 set therein. A crank arm 43 pivoted at one end to the pin 39 is pivotally connected with the free end of an arm 47 mounted on a shaft 45 suitably journaled in the frame 11 of the press. The shaft 45 at each end has arms 49 which are adapted to be swung through a definite angular displacement upon the rotation of the shaft 37. A member 51 slidably mounted in the frame of the press engages the end of one of the arms 49 and is reciprocated thereby each time the shaft 37 rotates. A pawl 53 is arranged at the end of the shaft 51 in position to engage pins 27 spaced about and extending outwardly of the peripheral edge of the member 21. Upon reciprocation of the member 51, the pawl engages one of the pins and the member 21 is rotated sufficiently to move the member 21 through an angular displacement equal to the angular spacing of the sockets 25, so that after each cycle of operation of the pawl actuating mechanism, a socket is centered beneath the die 15.

In order that the die 15 may close upon the member 21 when a socket 25 is positioned thereunder, I have provided a means for controlling the operation of the movable die from the shaft 37. This means includes a cam member 59 mounted to rotate with the shaft 37 and adapted to co-operate with a cam following roller 61 carried by a die controlling shaft 63 slidably mounted in the frame 11 of the press. The operation of the die 15 is controlled by the shaft 63, depression of which causes a clutch connection to be formed between the fly wheel 19 and the ram 13, causing the latter to move downwardly and to remain in downward position until the rod 63 is released. The operation of the cam 59 is so synchronized with respect to movement of the mechanism for rotating the die member 21 so that the die 15 descends only when the member 21 is in stationary position with a socket 25 arranged beneath the die 15. The cam is so shaped that the rod 63 is depressed throughout a considerable portion of the rotation of the shaft 37, that is to say, the closing mold remains in closed position for an appreciable period or "dwell" to allow the mold to properly form the material in the socket 25.

Moldable material may be manually placed in the sockets 25 as the member 21 is rotated but I have shown a novel means for automatically feeding the moldable material into the sockets successively while the member 21 remains stationary during the forming stroke of the die 15. In the present instance, the moldable material comprises cylindrical blocks or discs 65 which are arranged in stacked relationship in a magazine 69 carried in a support 73 suitably secured to the frame of the press. The magazine is arranged to deposit the lowermost block 65 of the stack into an aperture or perforation 83 formed in the long arm 81 of a loader bar 77 suitably pivoted to the frame of the press. The arm 81 is adapted to move in a horizontal plane beneath the discharge end of the magazine and to transport the moldable material received from the magazine laterally to a position above a socket 25 as indicated by dotted lines in Figure 3 of the drawings, and to deposit the moldable material into the socket. The perforation 83 extends through the arm of the ejector bar and in order to prevent the block of moldable material from sliding down through the perforation, the bracket 73 is provided with an arm 75 extending beneath the arm 81 of the ejector bar. The loader bar is formed so that a portion of the arm remains beneath the discharge end of the magazine when the arm is in projected position whereby the stack of blocks contained in the magazine is prevented from sliding out. It is sometimes desirable, as for instance in the manufacture of timing gears, to arrange an insert member concentrically with respect to the block of moldable material and to thereafter consolidate the moldable material about the insert, and to accomplish this I have shown a second magazine 71 supported in the member 73 and adapted to contain a stack of inserts 67. The long arm of the loader bar extends beneath the discharge end of the magazine 71 and is provided with a perforation adapted to receive the bottom insert contained in the magazine and to carry the insert to a position over a socket 25 in which a block of moldable material has been positioned by the previous operation of the ejector bar, and to deposit the insert so positioned in concentric relationship within the block of moldable material. The arm 81 of the loader bar is provided with an ear 85 adapted to extend beneath this second magazine when the bar is in projected position in order to prevent the stack of inserts from sliding out of the magazine. The loader bar has a short arm 79 which pivotally engages a connecting rod 57 which in turn engages the end of an arm 49 carried by the shaft 45. As the arm 49 is moved forwardly the ejector bar is projected to the block feeding position shown in dotted lines in Figure 3 of the drawings. The arm 49 is so arranged with respect to the shaft 45 that the projecting movement of the ejector bar takes place only when the rotatable member 21 is stationary, that is to say, immediately after the pawl 53 and rod 51 have operated to move the member 21.

It is frequently desirable in apparatus of this general description to provide means for pre-heating the moldable material before it is formed by the dies, and I have provided an oven comprising a housing 113 arranged to enclose a portion of the periphery of the member 21. This housing is arranged in position such that the sockets 25 pass thereunder after receiving blocks of moldable material from the magazine 69 and before reaching molding position beneath the die 15. The housing is supported from the frame of the press by means of brackets 115 or any other suitable supporting means and has heating elements 117 which may be of any convenient type such as electrical heating elements or gas jets or other heating means of a controllable nature, and it will be apparent that inasmuch as the member 21 is rotated progressively at a uniform rate that each block of moldable material will remain beneath the housing of the heating oven throughout a similar time interval. This promotes uniformity of the molded product for the reason that the quality of molded products depends to a certain extent upon the temperature at which they are molded. Thus the device of my invention insures that each block is molded at approximately the same temperature.

In order to eject the molded objects from the sockets I have arranged devices associated with the sockets and comprising a piston or plunger 97 seated in the bottom of each socket. The piston is carried on a rod 99 which extends downwardly through the bottom of the socket and into a socket 93 formed in the body of the member 21. The rod 99 is provided with a shoulder 105 and a roller 101 at its bottom end. The roller is adapted to rest upon the surface of the table portion 17 of the press and the shoulder 105 is adapted to engage a spring 103 positioned between the shoulder 105 and the top of the groove 93 in order to urge the piston normally downward and into the bottom of the socket. The sockets 93 open into a groove 89 formed in the bottom of member 21. The lower ends of the rods 99 normally extend into this groove which is also adapted to receive a cam portion 107 protruding from the table portion 17. As the member 21 rotates the rollers 101 successively meet the cam portion 107 and are raised thereby against the tension of the springs 103. This results in the raising of the pistons 97 in the sockets 25 and the ejection of the formed devices, which may be removed from the member 21 by the scooping action of a guide member 109 suitably arranged above the table to deflect the ejected devices into a chute 111 arranged at the side of the member 21. The cam portion 107 is arranged in the table 19 in position to raise the formed devices from the sockets immediately after they are moved from molding position under the die 15.

It is thought that the invention and numerous of its attendant advantages will be understood from the following description and it will be obvious that the form, arrangement and construction of the parts may be varied without departing from the spirit and scope of the invention, the devices hereinbefore described being a preferred embodiment for purposes of illustration.

In my copending applications, Serial No. 247,671, filed January 18, 1928, and Serial No. 659,757, filed Mar. 7, 1928, I have illustrated and described means and methods for feeding blocks or discs of various moldable material to a closing mold and I do not intend to claim herein any of the matters therein illustrated and described.

Having thus described my invention, what I claim is new and desire to secure by Letters Patent is:—

1. In a device for molding blocks of plastic material, a forming die, means forming a treating zone, a mold member having a plurality of portions each adapted to co-operate with the forming die to form a closing mold, means for successively moving said portions through said treating zone and for arranging said portions in co-operating position, and means for introducing material to be molded into a said portion before the same is arranged in co-operating position.

2. In a device for molding blocks of plastic material, a forming die, means forming a treating zone, a pivoted mold member having a plurality of portions adapted to co-operate with the forming die to form a closing mold and means for successively moving said portions through said treating zone and for arranging said portions in position to cooperate with the forming die, means for swinging the pivoted member about its pivot to dispose the co-operating portions in co-operating position with respect to the forming die, and means for introducing material to be molded to a said portion before the same is arranged in co-operating position.

3. In a device for molding blocks of plastic material, a forming die, means forming a treating zone, a multiple mold member, and means for moving said portions through said treating zone and for co-operating said die successively with the several molds in the multiple mold member to form successively operating closing molds, and means for introducing material to be molded to a said portion before the same is arranged in co-operating position.

4. In a device for molding blocks of plastic material, a forming die, means forming a treating zone, a member formed to provide multiple molding portions, means for successively co-operating said forming die with the several portions of the said member in order to form successively operating closing molds, a magazine containing moldable material, and means for depositing moldable material from said magazine in each molding portion before it co-operates with the forming die.

5. In a machine for molding blocks of plastic material, a forming die, means forming a treating zone, a turn table pivoted to turn beneath said die and means for moving said turn table successively through said treating zone and then past the forming die, said turn table having portions formed in its periphery adapted to co-operate with the forming die to form a closing mold, means synchronized with the forming die whereby the table may be moved each time the forming die operates to present the formed portions of the turn table successively in positions to co-operate with the forming die, and means for introducing material to be molded to a said portion before the same is arranged in co-operating position.

6. In a device for molding blocks of plastic material, a forming die, means forming a treating zone, a conveyer adapted to carry material to the forming die through said zone, said conveyer being formed to co-operate with the forming die to provide a closing mold, means for guiding said formed portion to co-operating position.

7. In a device for molding blocks of plastic material, means forming a treating zone, a conveyor for carrying material through said treating zone to a forming die, said conveyor having a material receptacle formed therein, said receptacle being adapted to co-operate with the said forming die to provide a closing mold, and means for introducing material to be molded to a said portion before the same is arranged in co-operating position.

8. In a device for molding blocks of plastic material, a movable die, means forming a heated zone, a conveyor for carrying moldable material through said zone and positioning the same beneath the die, said die being adapted to close upon the conveyor, and the conveyor being adapted to co-operate with said die to form a mold for said material.

9. In a device for molding blocks of plastic material, a press including two movable members, one of said members having a socket formed therein to receive moldable material, means including a shiftable transfer member for introducing moldable material into the socket, means for moving and guiding the member to arrange the socket in position to co-operate with the other member to mold the contents of the socket, and means for operating the die member automatically when the socket is so positioned.

10. In a device of the class described, a press including a movable die and a pivoted carrier having sockets spaced therein to receive moldable material, each socket being of a form adapted to co-operate with the movable die member to form a closing mold, a shiftable loader member having a socket adapted to contain a predetermined quantity of moldable material, means to shift the loader member to loading position, means for moving the pivoted member to successively position the sockets in loading position with respect to the loader member and then into co-operating relationship with the movable die member, means for introducing moldable material to be molded to a said portion before the same is arranged in co-operating position, means for actuating the movable die member when the sockets are so positioned to form the moldable material therein and means arranged in the pivoted member and actuated by the movement thereof to eject the moldable material from the sockets as they emerge from co-operating relationship with the moldable die member.

11. In a device of the class described, a press including a movable die and a carrier adapted to receive moldable material at a loading station and carry the received material to the die, shiftable means adapted to cooperate with the carrier at said loading station to deposit a charge of moldable material therein, said carrier having a molding socket adapted to receive the moldable material and to co-operate with the movable die to form a closing mold, means for introducing moldable material to be molded to a said portion before the same is arranged in co-operating position, means for moving and withdrawing said socket from co-operating position, and means formed and arranged in the carrier for ejecting the material from the sockets, said means including an ejector actuated upon the withdrawal of said socket from co-operating position.

12. In a device of the class described including a press, a forming die arranged in the press, a carrier having a molding socket adapted to receive moldable material at a remote loading station and to co-operate with the die to form a closing mold for said material, shiftable means adapted to cooperate with the carrier at said loading station to deposit a charge of moldable material therein and means for guiding the carrier so as to position the socket in co-operating relationship with the die, means for introducing moldable material to be molded to a said portion before the same is arranged in co-operating position, an ejector mechanism, including a plunger arranged in the carrier and normally adapted to form a portion of the side walls of the socket, and means for actuating the ejector mechanism as the carrier is moved to withdraw the socket from cooperating position in order to eject the material from the socket immediately after it has been formed in the mold.

13. In a machine for assembling machine elements consisting of a rim and a hub, a movable member having a series of cavities in which the gear elements may be assembled, a loading member capable of receiving a hub element at one point and a rim element at another and means for moving said loading member toward and from the movable member to introduce the elements into adjacent cavities whereby upon continued movement of the movable member, an element of each type may be introduced into each cavity.

14. In a machine for assembling machine elements consisting of a rim and a hub, a movable member having a series of cavities in which the elements may be assembled, a loading member adapted to receive, transport and deliver elements of each type to adjacent cavities and means for moving said loading member toward and from the movable member whereby upon continued movement of the movable member, an element of each type may be introduced into each cavity as the movable member moves past the loading member.

15. In a machine for assembling and consolidating machine elements consisting of a plastic rim and a non-plastic hub, a pivoted disc having a series of mold cavities in which gear elements may be assembled and consolidated, means for rotating the disc and means including a movable member for introducing gear elements into the cavities as they come opposite the loader member, said member being adapted to receive, transport and deposit an element of differing type into adjacent cavities whereby upon successive movements of the loader each cavity may receive a gear element of each type.

16. In a machine for assembling and consolidating machine elements composed of a metallic hub and a plastic rim, a movable member having a series of mold cavities in which the elements may be assembled, a loading member capable of receiving a hub element at one point and a rim element at another point and means for moving said loading member toward and from the movable member to introduce the elements simultaneously into adjacent mold cavities whereby upon the movement of the movable member a gear element of each type is introduced into each mold cavity.

17. In a device for molding plastic material, a forming die, a movable mold member, means for cooperating said die successively with several molds of the movable mold member to provide successively operating closing molds, a magazine containing moldable material and a shiftable carrier for transferring moldable material from said magazine successively into the several molds before the said die co-operates therewith.

18. In a device for molding plastic material, a forming die, a controllable treating zone, a conveyor for carrying moldable material through said zone and to said forming die, said conveyor comprising a multiple mold member and means for cooperating the die successively with the several molds of the multiple mold member, means for introducing moldable material into the several molds before the same passes through the heating zone.

19 In a device for molding plastic material, a forming die, a controllable oven forming a heated zone, a conveyor for carrying moldable material through said zone and to said forming die, said conveyor comprising a multiple mold member and means for co-operating the die successively with the several molds of the multiple mold member, means for introducing moldable material into the several molds before the same passes through the heating zone.

20. In a device for molding plastic material, a forming die, a movable mold member, means for co-operating said die successively with several molds of the movable mold member to provide successively operating closing molds, a magazine containing preformed blocks of moldable material and means for feeding blocks of material from said magazine successively into the several molds before the said die co-operates therewith.

In witness whereof, I have hereunto subscribed my name.

LOUIS T. FREDERICK.